United States Patent [19]

Hart

[11] 4,076,268
[45] Feb. 28, 1978

[54] SECURING MEANS

[75] Inventor: Frederick Leslie Hart, Cressage, England

[73] Assignee: GKN Sankey Limited, Bilston, England

[21] Appl. No.: 723,497

[22] Filed: Sep. 15, 1976

[30] Foreign Application Priority Data

Sep. 16, 1975 United Kingdom ............... 37954/75

[51] Int. Cl.² ............................................. B60P 7/00
[52] U.S. Cl. ............................. 280/179 R; 248/119 R
[58] Field of Search ............... 280/179 R; 105/368 R, 105/159; 248/119 R, 503

[56] References Cited

U.S. PATENT DOCUMENTS

| 3,753,579 | 8/1973 | Kuridich | 280/179 R |
| 3,955,847 | 5/1976 | Schiowitz | 280/179 R |

Primary Examiner—Robert R. Song
Attorney, Agent, or Firm—Barlow & Barlow

[57] ABSTRACT

The combination of an invalid's wheelchair and a vehicle for conveying the wheelchair from place to place in which the wheelchair is releasably held in position on the floor of the vehicle by cooperating hooks and cross bars and a releasable latch. Means being provided for holding the wheelchair against lateral movement and guides being provided for guiding into inter-engagement the hooks and cross bars on the one hand and the elements of the latch on the other hand as the wheel chair is moved into a predetermined position on the floor.

14 Claims, 4 Drawing Figures

SECURING MEANS

This invention relates to the combination of an invalid's wheelchair and a vehicle for conveying the wheelchair from place to place. By "vehicle" we mean to include any device in which the wheelchair can be moved from place to place including, e.g., a motor car or bus, an ambulance, an aeroplane and a ship.

It is necessary to lock the wheelchair in position on the vehicle during movement of the latter. Heretofore, the locking means used, while adequate during normal operation of the vehicle, have been insufficiently strong positively to locate the wheelchair if the vehicle was excessively accelerated or decelerated, e.g., in a collision. Moreover, the wheelchair structure has been such as to be unable to withstand forces to which it may be subjected during such excessive acceleration or deceleration.

It is especially important to secure a wheelchair in position on a vehicle where the occupant of the wheelchair is in control of the vehicle. Vehicles have been proposed in which the occupant of a wheelchair can wheel himself into the vehicle, lock the wheelchair in position and then drive the vehicle. If such a vehicle is in a collision it is vital for the occupant that the integrity of the wheelchair and the vehicle is not destroyed.

It is an object of the invention to provide a combination of a wheelchair and a conveying vehicle therefore which overcomes the above problems.

We provide, according to the invention, in the combination of an invalid's wheelchair and a vehicle (as hereinbefore defined) for conveying said wheelchair, means for releasably securing the wheelchair in a predetermined position on a floor of the vehicle, said securing means comprising: hook means having spaced, substantially horizontal limbs on the floor or on the wheelchair adjacent one end thereof; cross bar means on the wheelchair adjacent said one end or on the floor, the cross bar means fitting closely between said limbs when the wheelchair is in said position to prevent substantial vertical relative movement between the wheelchair and the floor; first complementary locating elements on the hook means and the cross bar means to prevent substantial longitudinal movement of the cross bar means relative to the hook means when engaged therewith; complementary latching elements on the floor and on the wheelchair to prevent, when latched with the wheelchair in said position, disengagement of the hook means and the cross bar means; second complementary locating elements on the floor and on the wheelchair adjacent the other end thereof to prevent substantial relative vertical movement between the floor and the wheelchair when the latter is in said position; and guide portions on the wheelchair and on the floor to guide into inter-engagement the elements of the locking means on the one hand and the hook and cross bar means on the other hand as the wheelchair is wheeled into said position on the floor.

We have found that by the use of complementary hook and cross bar means between the wheelchair and the floor which are engaged as the wheelchair is moved into position, a secure connection is made between the wheelchair and the floor. Preferably the cross bar means or the hook means comprises part of a sub-frame of the wheelchair, which sub-frame also carries the latching element on the wheelchair. This sub-frame gives the wheelchair the necessary strength and may be built into the wheelchair on initial manufacture or may be made as a separate entity for securing to a wheelchair which is commerically available.

Preferably, when the cross bar means is engaged in the hook means, the cross bar means is forced into engagement with either the upper or lower limbs of the hook means. The wheelchair may have spoked, pneumatically-tired wheels at said one end and the arrangement may be such that when the cross bar means is engaged in the hook means, the cross bar means is forced into engagement with the lower limbs of the hook means thus raising the wheelchair while maintaining the tires in traction engagement with the floor.

In this latter arrangement, although the tires retain traction engagement with the floor so that the wheelchair can be moved into and out of its predetermined position, some of load of the occupant will be relieved from the spokes and will be transfered directly from the wheelchair frame to the floor via the inter-engagement of the hook means and the cross bar means.

In an alternative, and less preferred arrangement, the cross bar means engages the upper limbs of the hooks thus compressing the pneumatic tires and ensuring that there is close frictional engagement between the cross bar means and the hook means. In this arrangement the compression of the tires must not be such as to prevent the occupant disengaging the cross bar means from the hook means.

The first complementary locating elements may be collars on the cross bar means engaging vertical surfaces on the hook means. The collars and hook means will prevent lateral movement of the wheelchair relative to the floor when the wheelchair is in its predetermined position. The collars preferably also provide guide portions for guiding into inter-engagement the cross bar means and the hook means as the wheelchair is moved on the floor into said predetermined position.

In a preferred arrangement, the hook means comprise a pair of spaced hooks secured to the floor and the cross bar means comprises a cross bar secured to the chair and engageable with both hooks.

The latching elements may comprise a pin and a jaw arranged releasably to engage around a pin. The pin may also provide guide portions for guiding the pin into inter-engagement with the jaw.

The second complementary locating elements may be formed by parts of the latching elements. Thus the second complementary locating elements may comprise a head on the pin and a facing surface of the jaw. In this construction, the latching elements will not only serve to hold the wheelchair with the hook means and cross bar means inter-engaged but will also prevent vertical relative movement between the wheelchair and the floor of the end of the wheelchair adjacent to which the latch means are situated.

In an alternative arrangement, the second complementary locating elements are further hook means having spaced, substantially horizontal limbs on the floor or on the wheelchair adjacent said other end thereof and further cross bar means on the wheelchair adjacent said other end thereof or on the floor, the further cross bar means fitting closely between said limbs when the wheelchair is in said predetermined position to prevent substantial vertical relative movement between the wheelchair and the floor. The sub-frame preferably also carries the further cross bar means or further hook means.

In a preferred arrangement, the further hook means comprise a pair of spaced hooks secured to the floor and the further cross bar means is carried by the sub-frame to engage both of said hooks.

The invention will now be described in detail by way of example with reference to the accompanying drawings in which.

Figure 1:
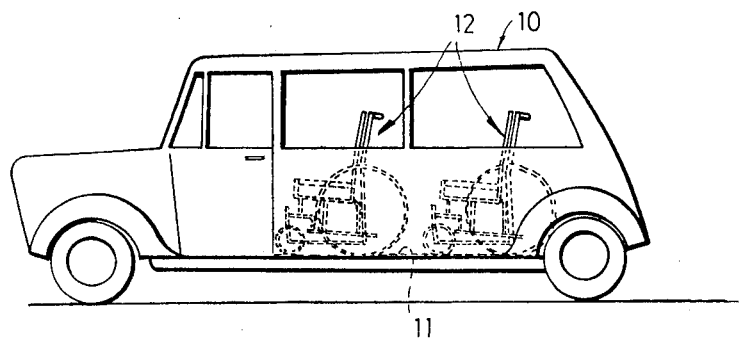
FIG. 1 is a diagrammatic view showing a vehicle containing a number of invalids' wheelchairs secured to the floor thereof.

Referring now to FIG. 1, this shows a vehicle 10 in the form of an ambulance having an internal floor 11 on which are supported and secured a number of invalids' wheelchairs 12.

Figure 2:
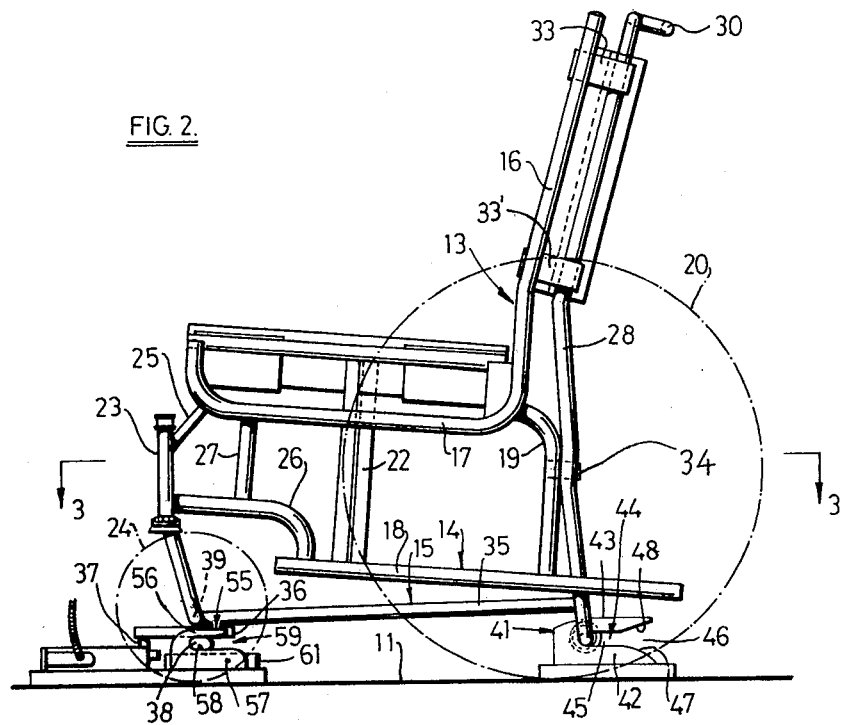
FIG. 2 is a side elevation showing a wheelchair resting on the vehicle floor and a securing means for that purpose.
Figure 3:
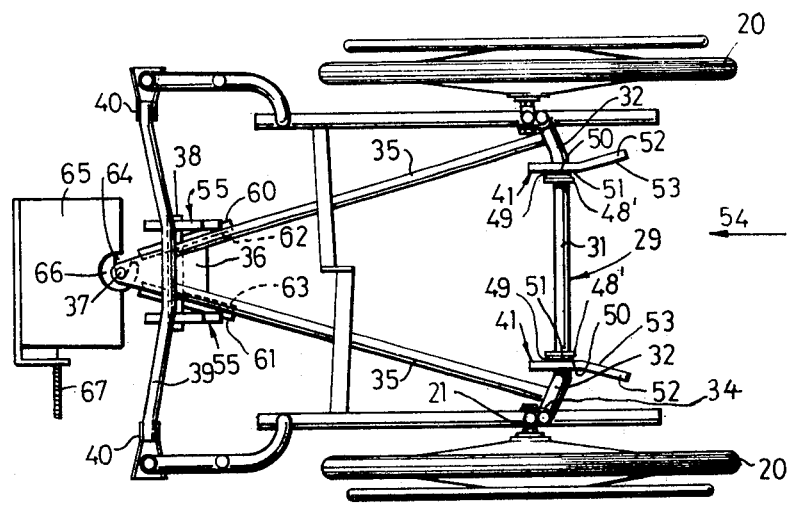
FIG. 3 is a section on the line 3—3 of FIG. 2.

Referring to FIGS. 2 and 3, the wheelchair comprises three sub-frames. There is the seat sub-frame 13, the wheel-supporting sub-frame 14 and the special strengthening sub-frame 15 which includes or carries the cross bars and latching element for engaging with hooks and a further latching element on the vehicle floor 11 as will be described below. In the example shown in the drawings the sub-frames 13 and 14 are those of a conventional invalid's wheelchair to which has been secured the third sub-frame 15 thus strengthening the conventional wheelchair and making it suitable for securing to the floor of the vehicle by the present invention.

The seat sub-frame 13 comprises back-rest members 16 and seat supporting members 17. The wheel supporting sub-frame comprises two inclined members 18 secured to the junction between the members 16 and 17 by two wheel-supporting members 19 on which are pivotally mounted pneumatically tired wheels 20 by stub axle means 21. At their forward ends the inclined members 18 are secured to the seat-supporting members 17 by members 22. Vertical tubes 23 are provided for supporting castor front wheels 24 and these tubes are secured to the seat supporting members 17 by inclined members 25. The tubes 23 are secured to the inclined members 18 by curved members 26 and between these members 26 and the seat-supporting members 17 extend vertical members 27.

The sub-frame 15 comprises two generally vertical members 28 joined at their bottoms by a cross bar 29 and at their tops by a cross bar 30. It will be seen that the cross bar 29 has a central straight portion 31 and end portions 32 inclined forwardly relative to the central portion 31. The cross member 30 provides a handle whereby the wheelchair may be moved by a pedestrian. Each of the members 28 is secured to a backrest member 16 by spaced straps 33 and 33'. Each member 28 is also secured to a wheel-supporting member 19 by a strap 34 welded to the member 28 and secured on the stub axle means 21.

From adjacent the lower ends of the members 28 extend forwardly two horizontal members 35 which converge and are joined at their forward ends by a gusset plate 36 which supports a latching pin 37 which depends from the plate 36. Secured to the bottom surface of the plate 36 is a cross bar 38 which is horizontal and is of oval section as will be seen from FIG. 2. Secured to the upper surface of the gusset plate 36 is a cross member 39 which at its ends has channel shaped brackets 40 secured to the lower ends of the tubes 23.

It will be seen that the strengthening sub-frame 15 comprising the members 28, 35 and 39 is secured to the remaining sub-frames and extends from the front to the rear of the wheelchair. The wheelchair is secured in position by the cross bars 29 and 38 and the latching pin 37.

The central portion 31 of the cross bar 29 engages in two hooks 41. Each hook 41 has a lower limb 42 and an upper limb 43 and these limbs define between them an opening 44 which has a parallel-sided portion 45 within which the central portion 31 of the cross member is a close fit and a diverging portion 46 formed between divergent faces 47 and 48 on the limbs 42 and 43 respectively. The divergent faces 47 and 48 guide the cross bar portion 31 into the parallel-sided portion 45 when the wheelchair is being wheeled into the predetermined position in which it is locked on the vehicle floor.

The central portion 31 of the cross bar 29 has a pair of spaced collars 48'. These collars 48' have chamfered portions 49 and faces 50 which, when the wheelchair is in the position shown, are juxtaposed to faces 51 on the hooks 41. It will be seen from FIG. 3 that there is only a small clearance between the faces 50 and the juxtaposed faces 51 thus locating the wheelchair laterally. It will also be seen from FIG. 3 that the parts 52 of the hooks 41 which provide the divergent faces 47 and 48 diverge when viewed in plan and the limbs of the hooks provide guide faces 53 which diverge rearwardly and serve to guide the collars 48' and thus the wheelchair into a central position as it is moved into its predetermined position in the direction of the arrow 54.

A further pair of hooks 55 are mounted on the floor 11 to receive the cross bar 38. These hooks have upper and lower limbs 56 and 57 respectively which provide a parallel-sided gap 58 and a divergent gap 59, the divergent part of the gap serving to guide the cross bars 38 into position as the wheelchair is moved in the direction of the arrow 54. Also secured to the floor 11 are convergent guide strips 60 and 61. These strips have guide faces 62 and 63 respectively which engage the latching pin 37 as the chair is moved into position and guide the latching pin into an opening 64 in the latch body 65. As shown, the pin 37 is embraced by a jaw 66. The latch is controlled by means of a Bowden cable 67 and operation of this cable can move the jaw 66 to release the pin 37. The Bowden cable is operated by a control, not shown, which will be within the reach of the occupant of the wheechair.

The wheelchair is shown in its predetermined locked position on the floor 11. The wheelchair in introduced into this position in the direction of the arrow 54 and as it is wheeled into position the latching pin 37 engages the guide faces 62 and 63 and the faces 50 of the collars 48' engage the portions 52 of the hooks 41 thus centring the wheelchair and as the wheelchair is moved forward in the direction of the arrow 54 the cross bars 29 and 38 enter the hooks 41 and 55 respectively and move into the parallel gap portions 45 and 56 where the cross bars are a close fit. The arrangement is such that when the cross bars 29 and 38 are adjacent to the bases of the hooks 41 and 55 the latching pin 37 is in the position shown and may be embraced by the jaw 66 thus to hold the wheelchair in position. It will be seen that the wheelchair cannot move laterally either at its forward or rear end. It cannot move laterally to any substantial extent at its forward end because the latching pin 37 is in the gap 64 in the latching mechanism and gripped by the jaw 66. The wheelchair cannot move laterally at its rear end because of the juxtaposed faces 50 and 51 on the collars 48' and the hook members 41. The wheelchair cannot move vertically relative to the floor 11 because the cross bars 29 and 38 fit closely between the limbs of the hooks 41 and 55 in which they are engaged. The wheelchair cannot move in fore and aft directions relative to the floor. Forward movement is prevented by the cross bars 29 and 38 engaging the bases of the hooks and rearward movement is prevented by the jaw 66 engaging the latching pin 37. It will be seen, therefore, that the wheelchair is completely located relative to the floor 11. Should the vehicle be in a collision, the wheelchair therefore cannot move. Even if the vehicle were overturned, the wheelchair still could not move relative to the floor 11.

It is preferred that, as the wheelchair is moved into position, when the cross bar 29 is in the position shown in the Figures it is lifted somewhat from its normal state so as to relieve the spoked wheels 20 from some of the weight of the wheelchair and its occupant. This means that if the wheelchair is subjected to any abnormal loads due to abnormal acceleration or deceleration some of the load will be removed from the spokes. However, the raising of the wheelchair must not be such that the pneumatic tires on the wheels 20 lose traction contact with the floor 11 otherwise the occupant of the wheelchair would be unable to turn the wheels 20 to remove the wheelchair when required once the jaw 66 had been disengaged from the latching pin 37 by operation of the Bowden cable 67.

In an alternative arrangement, when the wheelchair moves into the position shown, the cross bar portion 31 may be forced downwardly in the parallel-sided portions 45 of the hooks 41. This ensures that the wheelchair is wedged firmly in position but the downward pressure must not be such as to prevent the user from withdrawing the wheelchair from the hooks once the latch 65 has been released.

Figure 4:
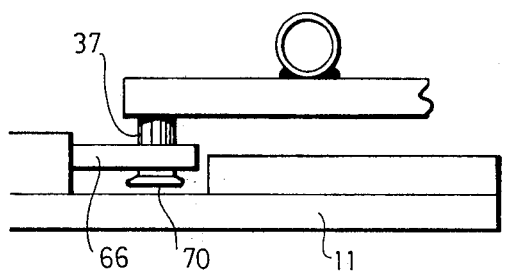
FIG. 4 is a detailed view showing a modified form of latching means.

FIG. 4 shows a modification in which the vertical location of the wheelchair at the front is obtained without use of the cross bar 38 and the hooks 55 which are dispensed with. In FIG. 4 the latching pin 37 is provided with a head 70 which engages below the jaw 66 and thus prevents upward vertical movement of the wheelchair. The construction is otherwise as described in relation to FIGS. 2 and 3.

It will be seen that the invention provides securing means whereby a wheelchair may be secured in a predetermined position on the floor of a vehicle so that it cannot move substantially relative to the vehicle. Various modifications may be made. Thus the hooks 41 and/or 55 may be mounted on the wheelchair frame while the cross bars 29 and/or 38 could be mounted on the floor of the vehicle. Moreover, the latching parts could be interchanged, the latch mechanism itself being on the wheelchair and the latching pin 37 being secured to the floor of the vehicle. In this case the control for the latch would be on the wheelchair instead of on the vehicle.

A special wheelchair may be made with the necessary hooks and/or cross bars but the conventional wheelchair may be modified by means of the strengthening sub-frame 15 which carries all the parts which engage with the complementary parts on the floor of the vehicle. This is a very convenient and strong arrangement.

Since the rear wheels of wheelchairs normally carry pneumatic tires the height of the rear cross bar relative to the floor of the vehicle will depend on the tire pressure and the weight of the occupant of the chair. Thus when using pneumatic rear wheel tires a range of rear wheel tire pressures will be recommended for the range of weights of occupants to be catered for so that for an occupant of a given weight there will be a recommended rear wheel tire pressure which will ensure that the rear cross bar is at the required height relative to its associated hooks. Similarly if pneumatic tires were to be used on the front wheels a corresponding range of recommended front wheel tire pressures will be provided in order to ensure that the front cross bar is at the required height relative to the associated hooks or, if the arrangement shown in FIG. 4 is used, the head 70 engages correctly below the jaw 66.

I claim:

1. In the combination of an invalid's wheelchair and a vehicle for conveying said wheelchair, means for releasably securing the chair in a predetermined position on the floor of the vehicle, said securing means comprising: hook means having spaced, substantially horizontal upper and lower limbs and cross bar means; one of said means fastened to the floor of the vehicle and the other means fastened to the wheelchair adjacent one end thereof; the cross bar means fitting closely between said limbs when the wheelchair is in said position to prevent substantial vertical relative movement between the wheelchair and the floor; first complementary locating elements on the hook means and the cross bar means to prevent substantial lateral movement of the cross bar means relative to the hook means when engaged therewith; complementary latching elements on the floor and on the wheelchair to prevent, when latched with the wheelchair in said position, disengagement of the hook means and the cross bar means; second complementary locating elements, one of said elements located on the floor of the vehicle and the other element located on the wheelchair adjacent the other end thereof to prevent substantial relative vertical movement between the floor of the vehicle and the wheelchair when the latter is in said position; and guide portions on the wheelchair and on the floor of the vehicle to guide into interengagement the elements of the latching means on the one hand and the hook and cross bar means on the other hand as the wheelchair is wheeled into said position on the floor.

2. Means according to claim 1 wherein the cross bar means comprises part of a sub-frame of the wheelchair, which sub-frame also carries one of the latching elements on the wheelchair.

3. Means according to claim 1 wherein, when the cross bar means is engaged in the hook means, the cross bar means is forced into engagement with one of the upper and lower limbs of the hook means.

4. Means according to claim 3 wherein said wheelchair has spoked, pneumatically tired wheels at said one end so that when the cross bar means is engaged in the hook means, the cross bar means is forced into engagement with the lower limbs of the hook means thus raising the wheelchair while maintaining the tires in traction engagement with the floor of the vehicle.

5. Means according to claim 1 wherein the first complementary locating elements are collars on the cross bar means which collars have faces engaging vertical surfaces on the hook means.

6. Means according to claim 5 wherein the collars also provide said guide portions on the wheelchair for engaging said guide portions on the floor to guide into inter-engagement the cross bar means and the hook means.

7. Means according to claim 1 wherein the hook means comprise a pair of spaced hooks secured to the floor and the cross bar means comprises a cross bar secured to the wheelchair and engageable with both hooks.

8. Means according to claim 1 wherein the latching elements comprise a pin and a jaw arranged releasably to engage around the pin.

9. Means according to claim 8 wherein the pin also provides said guide portions for guiding the pin into interengagement with the jaw.

10. Means according to claim 1 wherein the second complementary locating elements are formed by parts of the latching elements.

11. Means according to claim 10 wherein the latching elements comprise a pin and a jaw arranged releasably to engage around the pin and wherein the second complementary locating elements comprise a head on the pin and a facing surface of the jaw.

12. Means according to claim 1 wherein the second complementary locating elements are second hook means having spaced, substantially horizontal limbs and second cross bar means, one of said means fastened to the floor of the vehicle and the other fastened to the wheelchair adjacent said other end thereof, the second cross bar means fitting closely between said limbs when the wheelchair is in said position to prevent substantial vertical relative movement between the wheelchair and the floor.

13. Means according to claim 12 wherein the wheelchair includes a sub-frame which carries one of the second cross bar means and second hook means, one of the first mentioned cross bar means and first mentioned hook means and one of the latching elements.

14. Means according to claim 13 wherein the second hook means comprises a pair of spaced hooks secured to the floor of the vehicle and the second cross bar means is carried by the subframe and engages both said hooks of the second hook means.

* * * * *